Figure 1:
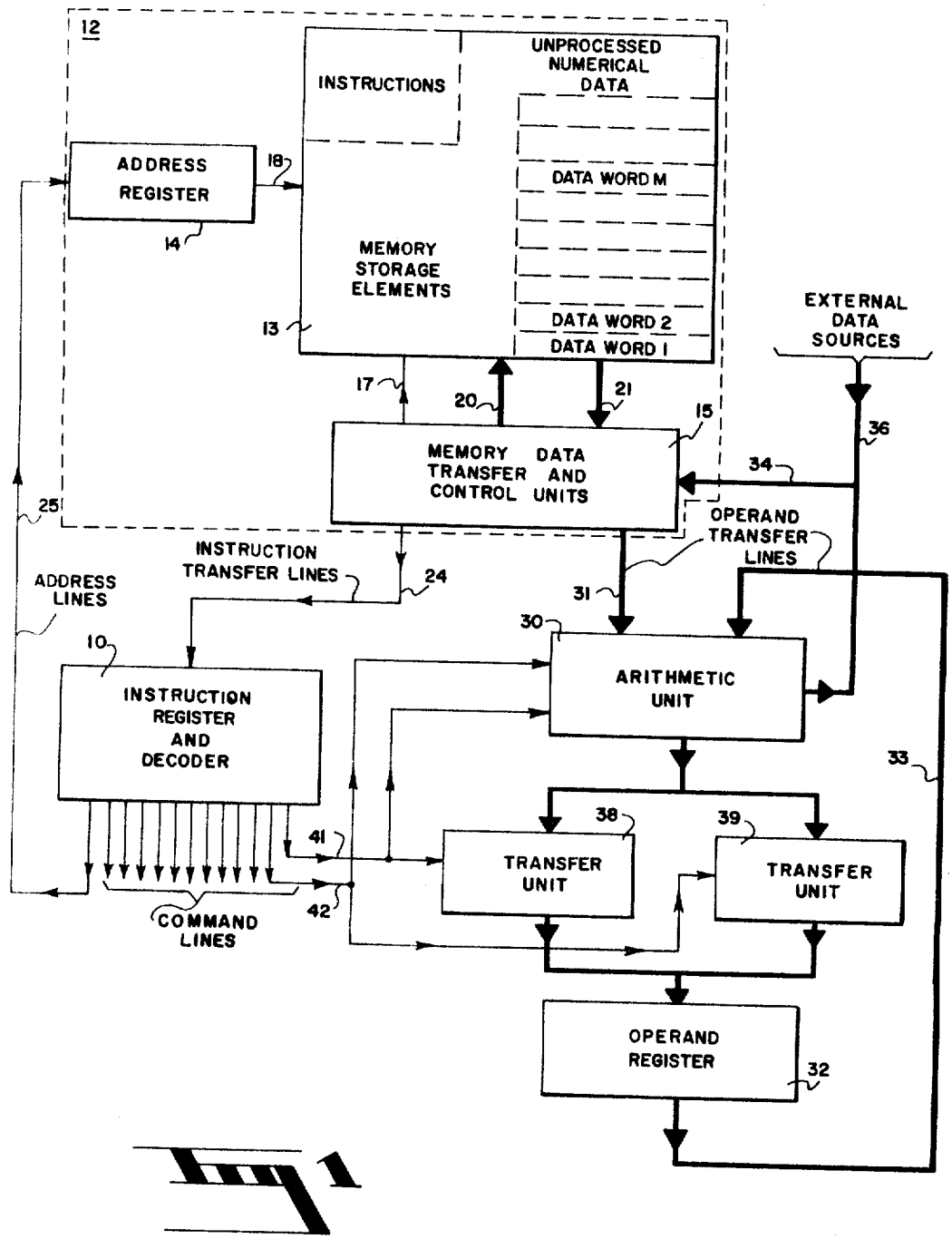

April 18, 1967 R. L. RUTH 3,315,234
DATA EDITING APPARATUS
Filed March 2, 1964 2 Sheets-Sheet 1

INVENTOR.
R. L. RUTH
BY
ATTORNEY

April 18, 1967 R. L. RUTH 3,315,234
DATA EDITING APPARATUS
Filed March 2, 1964 2 Sheets-Sheet 2
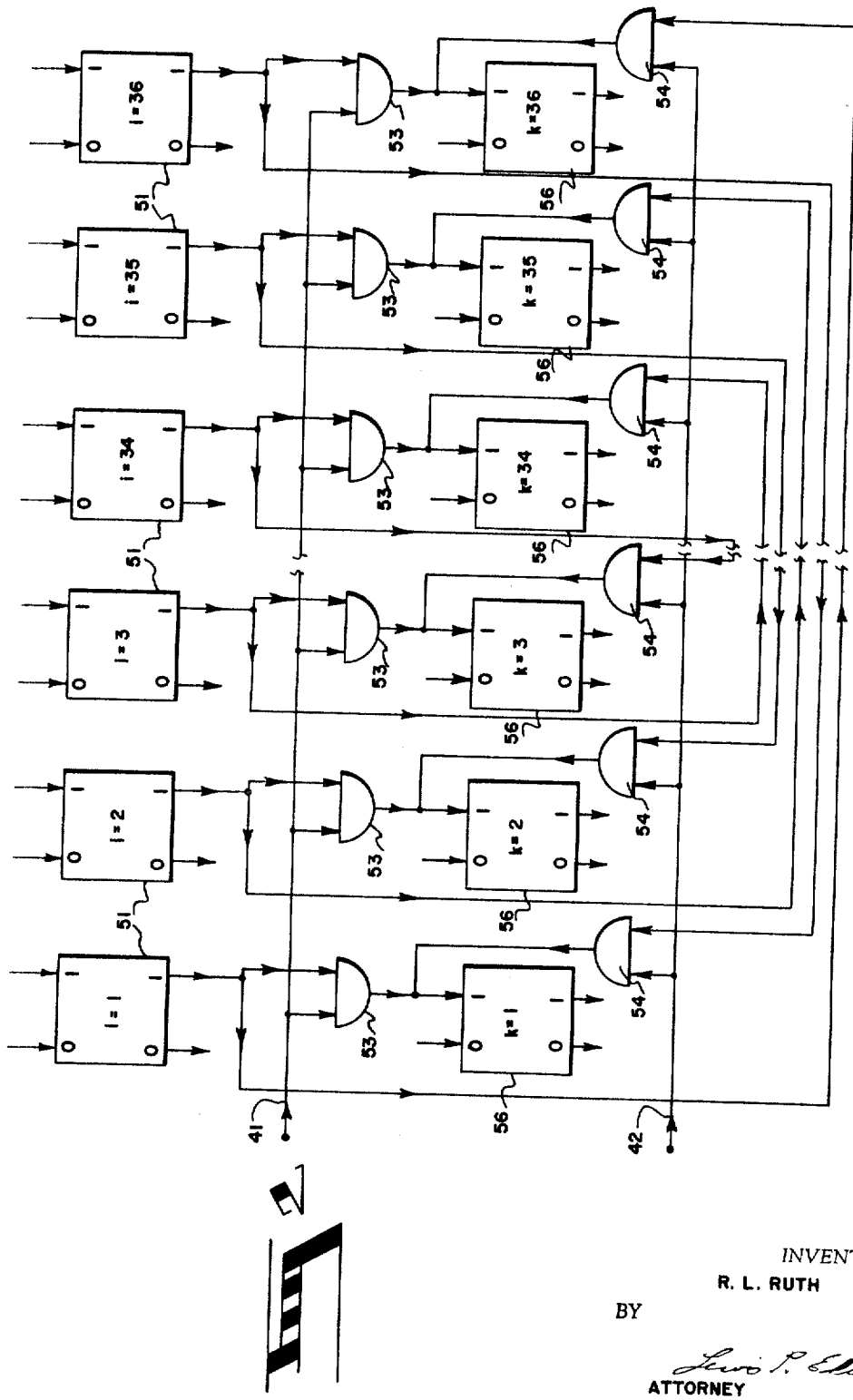
INVENTOR.
R. L. RUTH
BY
ATTORNEY United States Patent Office 3,315,234
Patented Apr. 18, 1967

3,315,234
DATA EDITING APPARATUS
Richard L. Ruth, Scottsdale, Ariz., assignor to General
Electric Company, a corporation of New York
Filed Mar. 2, 1964, Ser. No. 348,501
8 Claims. (Cl. 340—172.5)

This invention relates to systems for processing data and more particularly to apparatus for editing data to provide a common data structure for uniformity in processing.

A modern data processing system receives data from several different sources external to the system, temporarily stores the data and subsequently processes the data according to predetermined routines. For example, the system may receive: (a) continuous data over a communication link from a remote radar station, the data representing the momentary heading of the radar antenna; (b) continuous data over a telemetry channel, the data representing temperature, internal pressure, etc., of a missile in flight; (c) data transmitted by a teletypewriter and representing operating statistics of a business; (d) data read from punched cards and representing operating statistics of a business or the results of scientific experiments.

A substantial portion of this received data is in numerical form and represents quantities or values of the statistics or information supplied. The numerical data is provided by the source and stored and processed by the data processing system in a form wherein the quantities or values consist of a plurality of data digits. A data processing system for processing data so represented is known as a digital data processing system.

The data transmitted to the data processing system is frequently transmitted one digit at a time. In such a mode of transmission the data processing system stores each digit as it is received from the source. Each digit received is stored in a position in the system memory adjacent the position occupied by the previously received digit until a complete number has been provided by the external source. Upon retrieval of the number from the memory, the system in processing the number accords greatest numerical significance to the digit stored in the memory position allocated to hold the first received digit and decreasing significance to the digits stored in the memory positions allocated to hold the remaining digits in order of their receipt by the system. Thus, the digit occupying the memory position allocated to hold the last-arriving digit of a number is treated as the least significant.

A problem arising where a plurality of external sources is provided is that different ones of such sources may supply the digits of a number in different orders. Some of the sources may transmit a number by supplying the most significant digit first and others of the sources may supply the least significant digit first. For example, assume that both the punched card data and the radar data represent the data number 6073. The digit 3 is known as the least significant digit and the digit 6 as the most significant digit. Thus, the order of significance decreases from left to right according to the conventional manner of writing a number.

The card reader transmits the most significant digit of the number first and then remainder of the digits one at a time in decreasing order of significance. Accordingly, the most significant digit is stored in the memory position whose digit contents is treated as most significant during subsequent processing and the remainder of the digits occupy succeeding memory positions whose contents are accorded successively decreasing significance. Thus, the order of significance of each digit stored corresponds to the order of significance accorded the digit when processed by the system.

The radar, however, transmits the least significant digit of the number first and then the remainder of the digits one at a time in increasing order of significance. Accordingly, the least significant digit is stored in a memory position whose digit contents is treated as most significant during subsequent processing and the remainder of the digits occupy succeeding memory positions whose contents are accorded successively decreasing significance, although these remaining digits actually successively increase in significance. Finally, the last-arriving and most significant digit occupies the memory position whose contents is accorded least significance. Thus, the order of significance of each digit stored upon receipt from the radar corresponds inversely to the order of significance accorded the digit when processed by the system, so that the number provided by the radar will be processed as the value 3706 when retrieved from the memory if corrective measures are not taken.

In processing data stored in the memory thereof, a data processing system executes in sequence a limited number of discrete and different operations on the data, each such operation being controlled by a corresponding command. The operations performed include arithmetic, logical, shifting, and transfer operations. Each type of operation is always executed in the same manner regardless of the significance of the data on which the operation is performed. For example, in the operation of addition, corresponding digits of two numbers are added together to provide the respective digits of the sum. However, if the corresponding digits of the two numbers to be added are supplied with inverse orders of significance, an erroneous sum will be obtained.

Accordingly, prior art data processing systems arrange to edit the data to be processed therein for providing a common data structure for uniformity in processing. Such prior art systems invert the order of significance of the digits of certain numbers stored in the memory thereof, so that the most significant digit of each of the stored numbers occupies a position in memory whose contents is accorded greatest significance, and the remaining digits of each number of successively decreasing order occupy succeeding memory positions whose contents are accorded successively decreasing significance. Thus, the order of significance of the digit stored in each memory position corresponds to the order of significance accorded the digital contents of that position. In these prior art data processing systems several logical, shifting, and transfer operations are required for each digit of a number in order to invert the order of significance of the digits thereof, so that upon subsequent retrieval from memory the structure of the number corresponds to the required form for correct data processing. This prior art scheme for inverting the order of significance of the digits of a number is awkward, time-consuming and costly, and, because of its complexity, is conducive to errors. Accordingly, it is desirable to provide more rapid, less costly, and more accurate apparatus for inverting the order of significance of the digits of a number.

Therefore, it is the principal object of this invention to provide improved apparatus for editing data to supply a common data structure for uniformity in processing.

Another object of this invention is to provide improved apparatus for inverting the order of significance of the data digits representing a number in a data processing system.

The foregoing objects are achieved by providing a pair of reciprocal data transmission paths for each digit pair of a data number to be processed by the data processing system. The data numbers are stored in the memory of the system. The digits of a selected data number in memory are provided on respective output leads. The digits provided by each of the leads and the lead itself are accorded a respective predetermined order of significance by the system. There is further provided a register having a storage element for each digit of the data numbers. Each of the storage elements and the digit contents thereof are also accorded a respective predetermined order of significance by the system. First and second controllable transfer means, each having a transfer channel for each of the digits of a data number, are coupled between the memory and the register. Each transfer channel of the first transfer means couples a respective one of the output leads to a respective storage element of the register, the order of significance of the output lead and the storage element coupled to each of the channels of the first data transfer means being alike. Each transfer channel of the second transfer means couples a respective one of the output leads to a respective storage element of the register, the order of significance of the output lead and the storage element coupled to each of the channels of the second data transfer means being inversely related. In response to a first command signal provided by the data processing system the first transfer means transfers a data number from the memory to the register, the order of significance of the number digits being preserved during the transfer. In response to a second command signal provided by the system, the second transfer means transfers a data number from the memory to the register, the significance of the number digits being inverted during the transfer. Accordingly, the instant invention selectively controls the significance of data numbers transferred between one part and another of a data processing system, and thereby provides for editing data to supply a common data number structure for uniformity in processing.

The invention will be described with reference to the accompanying drawings wherein:

FIGURE 1 is a block diagram of a data processing system embodying the instant invention, and FIGURE 2 is a block diagram illustrating, in detail, the instant invention.

The data processing system of FIG. 1 is adapted to process data under operational control of an instruction register and decoder 10. The lines interconnecting the various components illustrated in FIG. 1 represent paths of data and control communication, the heavy lines representing paths of data and the light lines representing paths of control signals. The data processing system responds sequentially to a succession of distinct instructions supplied to decoder 10; these instructions being supplied in the order necessary to perform a particular data processing routine. A memory, shown generally by the reference numeral 12, stores these instructions and stores data words which are to be processed and data words which are the result of processing.

Memory 12 comprises memory storage elements 13, an address register 14, and a memory data transfer and control unit 15. Memory storage elements 13 are adapted to store a plurality of data words or instructions in a corresponding plurality of memory storage locations, each such location storing one data word or one instruction. Each memory storage location is designated by an address. An address register 14 stores the address of one of these memory locations. Memory transfer and control unit 15 retrieves the contents of or stores a data word or instruction in the location addressed by register 14. To provide its functions, a control unit 15 delivers signals on control lines 17 to control the retrieval or storage functions with respect to the particular memory location designated by address register 14. The address stored in register 14 is communicated to memory storage elements 13 over control lines 18. Data lines 20 illustrate the path provided for both data word and instruction storage into memory storage elements 13. Data lines 21 illustrate the path provided for data word and instruction retrieval from memory storage elements 13.

In normal operation of the system a group of the memory locations are reserved for the storage of the instructions which will control the sequence of operations to be performed by the system, and a group of the memory locations are reserved for the storage of unprocessed data words received from external data sources. Other groups of memory locations are reserved for the temporary storage of partially processed data words and for the storage of finally processed data words. Additionally FIG. 1 illustrates that a group of the storage locations is also reserved for unprocessed numerical data words.

The instruction generally comprises two portions, an address portion and a command portion, each portion comprising a plurality of digits. When the next sequential instruction is to be executed, memory data transfer and control unit 15 retrieves this next sequential instruction from memory storage elements 13 on data lines 21 and transfers the instruction on instruction transfer lines 24 to instruction register and decoder 10. The address portion of the instruction is then transferred to address register 14 over address lines 25, whereby during execution of the instruction this address portion will designate the memory location from which a data word is to be retrieved or in which a data word is to be stored. The digits of the command portion of the instruction word are decoded by decoder 10 and a unique signal is delivered on a respective one of the command lines. Whenever a command line delivers a signal, a corresponding operation is executed by the system.

An arithmetic unit 30 performs various arithmetic operations, such as the operations of addition and subtraction, on data words received thereby. One source of data words for arithmetic unit 30 is memory 12, these data words being supplied over data lines 21 and operand transfer lines 31. Another source of data words for arithmetic unit 30 is an operand register 32, these data words being supplied over data transfer lines 33. For example, in performing the operation of addition, arithmetic unit 30 may add together the data words received from memory 12 and operand register 32. The type of operation performed by arithmetic unit 30 is directed by the particular command line of decoder 10 which delivers an output signal. The output signals delivered by the arithmetic unit, which represent the results of the operation performed thereby, are transmitted to a register for temporary storage or may be returned to the memory, as over data transfer lines 34.

The arithmetic unit, under certain circumstances, may merely be employed as a link in a data transfer chain. In such instance, one of the data words receivable thereby must represent the numerical quantity 0 and this quantity is added to the other data word received by the arithmetic unit. For example, if a data word in memory 12 is to be transferred through arithmetic unit 30 to a register of the system, this data word is received by the arithmetic unit on lines 31, but input data on lines 33 inhibited from entering the arithmetic unit during such operation. Thus, the data word on lines 31 will pass unaltered through the arithmetic unit 30.

New data is received by the system from external data sources, not shown. Such sources may include the previously described radar station, telemetry channel, teletypewriter, or punched card reader. The one of these external sources selected for communication with the data processing system transmits its data to the system over input lines 36 and into memory 12. This data, as described previously, may be numerical in form, comprising a plurality of digits for each data word representing a number. The digits of a number may be transmitted by the external data source in the serial mode, one digit at a time. The data processing system receives and stores each such digit as it arrives in a respective position in a particular storage location of memory storage elements 13. Each storage location is adapted to store all of the digits comprising a data word and, accordingly, is provided with a number of storage positions equal to the number of digits in a data word.

In the embodiment of the instant invention, data is represented in the binary code. In the binary code each element of information, termed a binary digit, is represented by either a 1 or a 0. The 1 may be represented by a positive electrical signal and a 0 by a negative electrical signal. The data word employed herein comprises 36 binary digits. Therefore, each memory storage location comprises 36 storage positions.

Each binary digit of a numerical data word, in being processed by the system, is accorded a predetermined order of numerical significance. When the binary digits of numerical data words are supplied in sequence by an external data source, the system stores the first arriving binary digit of a number in the storage position of a memory location whose digit contents is accorded greatest significance by the arithmetic unit. The next arriving binary digit is stored in the same memory location, but in a storage position adjacent the preceding digit and is accorded next lower significance by the arithmetic unit. As each of the remaining 36 binary digits of the number arrive from the external data source, it is successively stored in a storage position adjacent the immediately preceding digit, occupying a storage position whose digit contents is accorded successively decreasing significance. Finally, the last-arriving binary digit of the number is stored in a storage position whose digit contents is accorded least significance by the arithmetic unit.

However, as previously described, certain ones of the external data sources will deliver the binary digits of the number transmitted with the most significant digit arriving first and the least significant digit arriving last, whereas others of the external data sources will transmit the least significant digit of the number first and the most significant digit last. If the numerical data word arrives with its most significant digit first, this most significant digit will be stored in the storage position whose digit contents is accorded greatest numerical significance by the arithmetic unit and the following digits of the data word will also be stored in storage positions whose digital contents are accorded numerical significance corresponding to the numerical significance of the received digits stored therein. On the other hand, if the numerical data word arrives with its least significant digit first, the first arriving digit will also be stored in a storage position accorded greatest significance by the arithmetic unit. The later arriving digits of increasingly greater significance will be stored in respective storage positions accorded decreasing numerical significance. Finally, the most significant digit, which arrives last, will be stored in a position accorded least significance. Thus, the data word number supplied with least significant digit first will have the digits thereof stored in storage positions whose digital contents are accorded a numerical significance inverse to the numerical significance of the actual digits stored therein. In accordance with the principles of the instant invention, this latter type of data word, which is supplied least significant digit first, is edited so that the structure thereof will correspond with the structure of the former type of data word, which is supplied most significant digit first, by providing simple, rapid and inexpensive apparatus for editing data words whose digits have inverted order of significance with respect to the positions they occupy in the system.

The instant invention provides a pair of data transfer units 38 and 39 for selectively controlling the order of numerical significance of the digits of data words stored in memory 12 and transferred through arithmetic unit 30 to operand register 32 in order to provide a common data structure for these data words. Operand register 32 comprises a plurality of storage elements equal in number to the number of digits in a data word. Transfer unit 38 transfers a data word therethrough in response to a signal provided on command line 41, such signal being provided when a first type of instruction, is decoded by decoder 10. Transfer unit 39 transfers a data word therethrough in response to a signal provided on command line 42, such signal being provided when a second type of instruction is decoded by decoder 10.

Transfer unit 38 transfers a data word therethrough without altering the order of numerical significance of the digits thereof and inserts the digits into respective storage elements of operand register 32. Accordingly, upon transfer through transfer unit 38, each digit is accorded the same order of significance in a storage element of register 32 as it was accorded in the memory storage position from which it originated. In controlling the transfer of a data word from a memory location through transfer unit 38 to operand register 32, the signal on command line 41 is also applied to arithmetic unit 30 to inhibit entry therein of data from operand register 32. Therefore, under control of a signal on command line 41 the arithmetic unit adds only the quantity 0 to the data word received from memory 12 on lines 31, so that the data word is delivered unaltered to transfer unit 38.

Transfer unit 39 transfers a data word therethrough, inverting the order of numerical significance of the digits thereof, and inserts the digits in respective storage elements of register 32. Accordingly, upon transfer through transfer unit 39, each digit is accorded the inverse order of significance in a storage element of register 32 as it was accorded in the memory storage position from which it originated. For example, the digit occupying the most significant storage position of the original memory location is transferred by transfer unit 39 to the storage element of register 32 whose digit contents is accorded least significance. The digit occupying the least significant storage position of the original memory location is transferred to the storage element of register 32 whose digit contents is accorded most significance. In controlling the transfer of a data word from a memory location through transfer unit 39 to a operand register 32, the signal on command line 42 is also applied to arithmetic unit 30 to inhibit entry therein of data from operand register 32. Therefore, under control of a signal on command line 42, the arithmetic unit adds only the quantity 0 to the data word received on lines 31, so that the data word is delivered to transfer unit 39 representing the same number as it did in memory 12.

The instant invention is employed in the following manner for editing data in the system of FIG. 1. For a numerical data word in memory 12 which has the digits thereof stored in proper order of significance, an instruction is directed to decoder 10 to provide a signal on command line 41. The corresponding data word is then transferred from memory 12 through arithmetic unit 30, through transfer unit 38, and into operand register 32 without altering the order of significance of the digits of the word. For a numerical data word in memory 12 which has the digits thereof stored in inverted order of significance, an instruction is directed to decoder 10 to provide a signal on command line 42. The corresponding data word is then transferred from memory 12 through arithmetic unit 30, through transfer unit 39 and into operand register 32, thereby inverting the order of significance of the digits of the word. Accordingly, the instant invention, shown generally in FIG. 1, provides for editing data to provide a common numerical data structure for uniformity in subsequent processing.

The detailed structure and operation of the invention will now be described with reference to FIG. 2. The data word to be edited has the digits thereof supplied from a source providing a separate representation for each of the digits. In accordance with the principles of the invention, this source may comprise the individual binary storage positions of a storage location in memory 12 or may comprise the storage elements of a register. Such source is shown schematically in FIG. 2 as comprising a plurality of bistable devices 51, there being provided one bistable device for each storage element or storage position. Each of bistable devices 51 stores and supplies a respective one of the binary digits provided. In the instant embodiment, wherein a data word comprises 36 binary digits, 36 bistable devices 51 supply the respective digits of the data word.

A bstable device is a device adapted to operate in either one of two stable states and to transfer from the stable state in which it is operating to its other stable state upon application of a suitable trigger signal thereto. In one state of operation the bistable device represents the binary 1 digit (1-state) and in the other state the binary 0 digit (0-state).

The two upper leads for each bistable device 51 are input leads to which trigger signals are applied for transferring the bistable device to the requisite state. For example, a signal on the upper lead opposite the numeral 0 (0-input lead) transfers bistable device 51 to the 0-state if it is not already in the 0-state. Similarly, a signal on the upper lead opposite the numeral 1 (1-input lead) transfers bistable device 51 to the 1-state if it is not already in that state. The two lower leads of each bistable device 51 represent the states of operation of the device. When the bistable device is in the 0-state, a signal is delivered on the lower lead opposite the numeral 0 (0-output lead). When the bistable device is in the 1-state, a signal is delivered on the lower lead opposite the numeral 1 (1-output lead). In the embodiment of FIG. 2 only the 1-output leads of bistable devices 51 are employed. Thus, the data source, comprising bistable devices 51, delivers a signal on all of the 1-output leads thereof for which the corresponding bistable devices represent the binary 1 digit.

Bistable devices 51 are designated, generally, by the letter $i$, where $i$ is assigned the consecutive numbers 1, 2, . . . 36 for the respective ones of the bistable devices.

The output leads of the data source are coupled to transfer units 38 and 39 (FIG. 1). Transfer unit 38 comprises a plurality of transfer channels, such as AND-gates 53, there being provided one AND-gate 53 for each digit of the data word to be transferred. Transfer unit 39 comprises a plurality of transfer channels, such as AND-gates 54, there being provided one AND-gate 54 for each digit of the data word to be transferred. Each of AND-gates 53 and 54 is a device having a pair of input leads and a single output lead, and adapted to deliver a signal on the output lead when, and only when, signals are received on both input leads.

One input lead of each of AND-gates 53 is connected to command line 41. The other input lead of each of AND-gates 53 is connected to the 1-output lead of a respective one of bistable devices 51. Accordingly, when a signal is provided on command line 41, each AND-gate 53 that is coupled to a bistable device 51 which at that time is operating in the 1-state delivers an output signal on the output lead thereof. Therefore, the aggregate of the output signals delivered by AND-gates 53 of transfer unit 38 represents the data word supplied by the data source when a signal is delivered on command line 41.

The output leads of transfer units 38 and 39 are coupled to an operand register 32 (FIG. 1). Operand register 32 comprises a plurality of bistable devices 56 of the type heretofore described. One type of bistable device commonly used for registers in data processing systems is the electronic flip-flop, a device well known in the art. A separate bistable device 56 is provided for storing for each of the binary digits of the data word. In the instant embodiment, 36 bistable devices 56 comprise register 32.

Bistable devices 56 are designated, generally, by the letter $i$, where $i$ is assigned the consecutive numbers 1, 2, . . . 36 for the respective ones of the bistable devices.

The output lead of each of AND-gates 53 is connected to the 1-input lead of the respective one of bistable devices 56 whose designation of $k$ is assigned the same numerical value as the numerical value of $i$ for the bistable device 51 coupled to the AND-gate. For example, a first of AND-gates 53 has connected to an input lead thereof the 1-output lead of the bistable device 51 designated by $i=1$ and has the output lead thereof connected to the 1-input lead of the bistable device 56 designated by $k=1$. Therefore, the numerical value of $i$ for each bistable device 51 connected to an input lead of an AND-gate 53 is equal to the numerical value of $k$ for the bistable device 56 coupled to the output lead of such AND-gate. Consequently, $i=k$ for the respective bistable devices coupled to each of AND-gates 53. Upon receipt of a signal on command line 41, AND-gates 53 transfer the digital contents of bistable devices 51 to correspondingly numbered bistable devices 56. Accordingly, the order of significance of the digits of the data word supplied by bistable devices 51 remains unchanged in the transfer of the data word through AND-gates 53 to bistable devices 56.

One input lead of each of AND-gates 54 is connected to command line 42. The other input lead of each of AND-gates 54 is connected to the 1-output lead of a respective one of bistable devices 51. Accordingly, when a signal is provided on command line 42, each AND-gate 54 that is coupled to a bistable device 51 which at that time is operating in the 1-state delivers an output signal on the output lead thereof. Therefore, the aggregate of the output signals delivered by AND-gates 54 of transfer unit 39 represents the data word supplied by the data source when a signal is delivered on command line 42.

The output lead of each of AND-gates 54 is connected to the 1-input lead of the respective one of bistable devices 56 whose designation of $k$ is assigned an inverse numerical value compared with the numerical value of $i$ for the bistable device 51 coupled to the AND-gate. For example, a first of AND-gates 54 has connected to an input lead thereof the 1-output lead of the bistable device 51 designated by $i=1$ and has the output lead thereof connected to the 1-input lead of the bistable device 56 designated by $k=36$. Therefore, the numerical value of $i$ for each bistable device 51 connected to an input lead of an AND-gate 54 is equal to 37 minus the numerical value of $k$ for the bistable device 56 coupled to the output lead of such AND-gate. Consequently, $i=37-k$ for the respective bistable devices coupled to each of AND-gates 54. Upon receipt of a signal on command line 42, AND-gates 54 transfer the digital contents of bistable devices 51 to respective ones of bistable devices 56. Accordingly, the order of significance of the digits of the data word supplied by bistable devices 51 is inverted in the transfer of the data word through AND-gates 54 to bistable devices 56.

The principles of design of the invention embodied in the particular apparatus of FIG. 2 may be extended to apparatus for editing data words comprising any number of digits. The data word to be edited is said to have "$n$" digits, $n$ representing the total number of digits of the data word. The digits of the data word supplied by the source will be provided as "$n$" separate representations, each of the digit representations being designated, generally, by the letter $i$, where $i$ is assigned the consecutive numbers 1, 2, . . . $n$ for respective ones of the digit representations. Thus, for the last of these digit representations $i$ is assigned the number $n$. The receiving means for the data transfer, corresponding to operand register 32, comprises $n$ receiving portions, such as bistable devices 56, each of the receiving portions being designated, generally, by the letter $k$, where $k$ is assigned the consecutive numbers 1, 2, . . . $n$ for respective ones of the portions. Thus, for the last receiving portions, $k$ is assigned the number $n$. The numerical value of $i$ for the digit representation coupled to each first transfer channel, such as AND-gate 53, is equal to the numerical value of $k$ for the receiving portion coupled to that channel. Therefore, $i=k$ for the respective digit representation and receiving portion coupled to each first transfer channel in this more general embodiment of the invention. The numerical value of $i$ for the digit representation coupled to each second transfer channel, such as AND-gate 54, is equal to $n+1$ minus the numerical value of $k$ for the receiving portion coupled to that channel. Therefore, $i=n+1-k$ for the respective digit representation and receiving portion coupled to each second transfer channel. Upon receipt of a first command signal the first transfer channels transfer a data word without change in the order of signifiicance of the digits thereof from the source to the receiving means. Upon receipt of a second command signal, the second transfer channels transfer a data word with inverted order of significance of the digits thereof to the receiving means.

Accordingly, there has been described herein apparatus for editing data to provide data words having a common numerical order of significance of the digits thereof for uniformity in processing. The apparatus functions by selectively controlling the transfer of data words representing numbers from a source to a receiving means so that the digits of the data words are transferred with either their original order of significance unchanged or with their order of significance inverted.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those prniciples. The appended claims are therefore intended to cover and embrace any such modifications, within the limits only of the true spirit and scope of the invention.

What is claimed is:

1. Apparatus for editing data comprising: a source of data items comprising a plurality of digits, said source providing a separate representation for each of said digits, each of said digit representations being accorded a respective predetermined order of significance; a receiving means having a plurality of receiving portions, each of said portions being adapted to receive one of said digit representations, each of said portions being accorded a respective predetermined order of significance; first transfer means having a plurality of first transfer channels, each of said first channels being coupled to said source to receive a respective one of the digit representations provided and to a respective one of said receiving portions, the order of significance of the receiving portions coupled to each of said first channels corresponding to the order of significance of the digit representations received thereby, each of said first channels transferring the digit representation received thereby to the receiving portion coupled thereto; and second transfer means having a plurality of second transfer channels, each of said second channels being coupled to said source to receive a respective one of the digit representations provided and to a respective one of said receiving portions, the order of significance of the receiving portions coupled to said second channels corresponding inversely to the order of significance of the digit representations received thereby, each of said second channels transferring the digit representation received thereby to the receiving portion coupled thereto.

2. Apparatus for editing data comprising: a source of data items comprising $n$ digits, said source providing a separate representation for each of said digits, each of said digit representations being acccorded a respective predetermined order of significance; a receiving means having $n$ receiving portions, each of said portions being adapted to receive one of said digit representations, each of said portions being accorded a respective predetermined order of significance; first transfer means having $n$ first transfer channels, each of said first channels being coupled to said source to receive a respective one of the digit representations provided and to a respective one of said receiving portions, the order of significance of the receiving portions coupled to each of said first channels corresponding to the order of significance of the digit representations received thereby, each of said first channels transferring the digit representation received thereby to the receiving portion coupled thereto; and second transfer means having $n$ second transfer channels, each of said second channels being coupled to said source to receive a respective one of the digit representations provided and to a respective one of said receiving portions, the order of significance of the receiving portions coupled to said second channels corresponding inversely to the order of significance of the digit representations received thereby, each of said second channels transferring the digit representation received thereby to the receiving portion coupled thereto.

3. Apparatus for editing data comprising: a source of data items comprising $n$ digits, said source providing a separate representation for each of said digits, each of said digit representations being designated by the letter $i$, where $i$ is assigned the consecutive numbers 1, 2, . . . $n$ for respective ones of said digit representations; a receiving means having $n$ receiving portions, each of said portions being adapted to receive one of said digit representations, each of said portions being designated by the letter $k$, where $k$ is assigned the consecutive numbers 1, 2, . . . $n$ for respective ones of said portions; first transfer means having $n$ first transfer channels, each of said first channels being coupled to said source to receive a respective one of the digit representations provided and to a respective one of said receiving portions, the numerical value of $i$ for the digit representation received by each one of said first channels being equal to the numerical value of $k$ for the one of said receiving portions coupled to said one first channel, each of said first channels transferring the digit representation received thereby to the receiving portion coupled thereto; and second transfer means having $n$ second transfer channels, each of said second channels being coupled to said source to receive a respective one of the digit representations provided and to a respective one of said receiving portions, the numerical value of $i$ for the digit representation received by each one of said second channels being equal to $n+1$ minus the numerical value of $k$ for the one of said receiving portions coupled to said one second channel, each of said second channels transferring the digit representation received thereby to the receiving portion coupled thereto.

4. Apparatus for editing data comprising: a source of data items comprising a plurality of digits, said source providing a separate representation for each of said digits, each of said digit representations being accorded a respective predetermined order of significance; a receiving means having a plurality of receiving portions, each of said portions being adapted to receive one of said digit representations, each of said portions being accorded a respective predetermined order of significance; first transfer means having a plurality of first transfer channels, each of said first channels being coupled to said source to receive a respective one of the digit representations provided and to a respective one of said receiving portions, the order of significance of the receiving portions coupled to each of said first channels corresponding to the order of significance of the digit representations received thereby, each of said first channels being responsive to a first signal for transferring the digit representation received thereby to the receiving portion coupled thereto; means for selectively applying said first signal to said first transfer channels; second transfer means having a plurality of second transfer channels, each of said second channels being coupled to said source to receive a respective one of the digit representations provided and to a respective one of said receiving portions, the order of significance of the receiving portions coupled to said second channels corresponding inversely to the order of significance of the digit representations received thereby, each of said second channels being responsive to a second signal for transferring the digit representation received thereby to the receiving portion coupled thereto; and means for selectively applying said second signal to said second transfer channels.

5. Apparatus for editing data comprising: a source of data items comprising $n$ digits, said source providing a separate representation for each of said digits, each of said digit representations being accorded a respective predetermined order of significance; a receiving means having $n$ receiving portions, each of said portions being adapted to store one of said digit representations, each of said portions being accorded a respective predetermined order of significance; first transfer means having $n$ first transfer channels, each of said first channels being coupled to said source to receive a respective one of the digit representations provided and to a respective one of said receiving portions, the order of significance of the receiving portions coupled to each of said first channels corresponding to the order of significance of the digit representations received thereby, each of said first channels being responsive to a first signal for transferring the digit representation received thereby to the receiving portion coupled thereto; means for selectively applying said first signal to said first transfer channels; second transfer means having $n$ second transfer channels, each of said second channels being coupled to said source to receive a respective one of the digit representations provided and to a respective one of said reeciving portions, the order of significance of the receiving portions coupled to said second channels corresponding inversely to the order of significance of the digit representations received thereby, each of said second channels being responsive to a second signal for transferring the digit representation received thereby to the receiving portion coupled thereto; and means for selectively applying said second signal to said second transfer channels.

6. Apparatus for editing data comprising: a source of data items comprising $n$ digits, said source providing a separate representation for each of said digits, each of said digit representations being designated by the letter $i$, where $i$ is assigned the consecutive numbers 1, 2, . . . $n$ for respective ones of said digit representations; a receiving means having $n$ receiving portions, each of said portions being adapted to receive one of said digit representations, each of said portions being designated by the letter $k$, where $k$ is assigned the consecutive numbers 1, 2 . . . $n$ for respective ones of said portions; first transfer means having $n$ first transfer channels, each of said first channels being coupled to said source to receive a respective one of the digit representations provided and to a respective one of said receiving portions, the numerical value of $i$ for the digit representation received by each one of said first channels being equal to the numerical value of $k$ for the one of said receiving portions coupled to said one first channel, each of said first channels being responsive to a first signal for transferring the digit representation received thereby to the receiving portion coupled thereto; means for selectively applying said first signal to said first transfer channels; second transfer means having $n$ second transfer channels, each of said second channels being coupled to said source to receive a respective one of the digit representations provided and to a respective one of said receiving portions, the numerical value of $i$ for the digit representation received by each one of said second channels being equal to $n+1$ minus the numerical value of $k$ for the one of said receiving portions coupled to said one second channel, each of said second channels being responsive to a second signal for transferring the digit representation received thereby to the receiving portion coupled thereto; and means for selectively applying said second signal to said second transfer channels.

7. Apparatus for editing data comprising: a source of data items comprising $n$ diigts, said source providing a separate representation for each of said digits, each of said digit representations being accorded a respective predetermined order of significance, a storage means having $n$ storage elements, each of said storage elements being adapted to store a representation of one of said data item digits, each of the elements of said storage means being accorded a respective predetermined order of significance; first transfer means having $n$ first transfer channels, each of said first channels being coupled to said source to receive a respective one of the digit representations provided and to a respective one of said storage elements, the order of significance of the storage elements coupled to each of said first channels correspnoding to the order of significance of the digit representations received thereby, each of said first channels being responsive to a first signal for transferring the digit representation received thereby to the storage element coupled thereto; means for selectively applying said first signal to said first transfer channels; second transfer means having $n$ second transfer channels, each of said second channels being coupled to said source to receive a respective one of the digit representations provided and to a respective one of said storage elements, the order of significance of the storage elements coupled to each of said second channels corresponding inversely to the order of significance of the digit representations received thereby, each of said second channels being responsive to a second signal for transferring the digit representation received thereby to the storage element coupled thereto; and means for selectively applying said second signal to said second transfer channels.

8. In a data processing system for executing in sequence a plurality of operations, the combination comprising: memory means for storing representations of a plurality of different commands, said representations comprising a plurality of digits; a decoding device for receiving any one of said command representations and for decoding said one representation to provide a corresponding one of a plurality of output signals, each of said output signals being uniquely representative of a respective one of said commands; means for transferring said command representations in sequence from said memory means to said decoding device; first storage means having $n$ first data storage elements for storing a data item comprising a number having $n$ digits, each of said first elements storing a representation of a respective one of said data item digits, each of said first elements being designated by the letter $i$, where $i$ is assigned the consecutive numbers 1, 2, . . . $n$ for respective ones of said first elements; second storage means having $n$ second data storage elements, each of said second elements being adapted to store a representation of one of said data item digits, each of said second elements being designated by the letter $k$, where $k$ is assigned the consecutive numbers 1, 2, . . . $n$ for respective ones of said second elements; first transfer means having $n$ first transfer channels, each of said first channels being coupled to a respective one of said first elements and to a respective one of said second elements and responsive to a gating signal received thereby for transferring the digit representation stored in the first element coupled thereto to the second element coupled thereto, the numerical value of $i$ for the first element being equal to the numerical value of $k$ for the second element coupled to each of said first channels, whereby $i=k$ for the respective storage elements coupled to each of said first transfer channels; means for coupling one of said output signals provided by said decoding device to said first channels as said gating signal thereof; second transfer means having $n$ second transfer channels, each of said second channels being coupled to a respective one of said first elements and to a respective one of said second elements and responsive to a gating signal received thereby for transferring the digit representation stored in the first element coupled thereto to the second element coupled thereto, the numerical value of $i$ for the first element being equal to $n+1$ minus the numerical value of $k$ for the second element coupled to each of said second channels, whereby $i=n+1-k$ for the respective storage elements coupled to each of said second transfer channels; and means for coupling another one of said output signals provided by said decoding device to said second channels as said gating signal thereof.

No references cited.

ROBERT C. BAILEY, *Primary Examiner.*

G. D. SHAW, *Assistant Examiner.*